United States Patent [19]

Rifi

[11] Patent Number: 4,812,526

[45] Date of Patent: Mar. 14, 1989

[54] IMPACT POLYPROPYLENE

[75] Inventor: Mahmoud R. Rifi, Kendall Park, N.J.

[73] Assignee: Union Carbide Corporation, Danbury, Conn.

[21] Appl. No.: 59,053

[22] Filed: Jun. 8, 1987

[51] Int. Cl.$^4$ .............. C08L 23/12; C08L 23/20; C08L 23/08

[52] U.S. Cl. .................. 525/240; 525/322

[58] Field of Search .............. 525/240, 322

[56] References Cited

U.S. PATENT DOCUMENTS 3,758,643 9/1973 Fischer .............. 525/240
4,732,940 3/1988 Yamaoka et al. ............ 525/193
4,734,459 3/1988 Cecchin et al. .............. 525/247

FOREIGN PATENT DOCUMENTS 0077532 4/1983 European Pat. Off. .
0170255 2/1986 European Pat. Off. .
103478 8/1979 Japan .
58-157839 9/1983 Japan .
8403888 10/1984 PCT Int'l Appl. .

Primary Examiner—Carman J. Seccuro
Attorney, Agent, or Firm—Saul R. Bresch

[57] ABSTRACT

An impact polypropylene composition comprising:
  (i) isotactic polypropylene; and
  (ii) a copolymer of ethylene and an alpha-olefin comonomer having 3 to 8 carbon atoms, said copolymer (a) having a density of about 0.87 to about 0.90 gram per cubic centimeter and a crystallinity in the range of about 20 to about 35 percent by weight based on the weight of the copolymer and (b) being present in the composition in the range of about 20 to about 50 percent by weight based on the weight of the polypropylene.

3 Claims, No Drawings

IMPACT POLYPROPYLENE

TECHNICAL FIELD

This invention relates to an improved version of impact polypropylene.

BACKGROUND ART

Impact polypropylene is widely used in such applications as appliances, automobiles, furniture, and luggage. It is generally a blend of isotactic polypropylene with ethylene/propylene or ethylene/propylene/diene rubbers or a similar combination prepared in situ. The rubber modifier overcomes the low temperature brittleness and the lack of impact resistance of the isotactic polypropylene. However, when the polypropylene is modified with an amorphous rubber, it experiences a severe stress whitening or blush on impact, e.g., when an object made of this impact polypropylene is struck, a white discoloration appears. This is obviously undesirable as it limits the applications of the impact polypropylene.

DISCLOSURE OF THE INVENTION

An object of this invention, therefore, is to provide a polypropylene, which exhibits much reduced blushing together with high impact resistance.

Other objects and advantages will become apparent hereinafter.

According to the present invention, the above object is met by a composition comprising the following components:

(1) isotactic polypropylene; and
(ii) a copolymer of ethylene and an alpha-olefin comonomer having 3 to 8 carbon atoms, said copolymer (a) having a density of about 0.87 to about 0.90 gram per cubic centimeter and a crystallinity in the range of about 10 to about 30 percent by weight based on the weight of the copolymer and (b) being present in the composition in a range of about 20 to about 50 percent by weight based on the weight of the polypropylene.

DETAILED DESCRIPTION

Isotactic polypropylene homopolymer can be prepared by the process described in U.S. Pat. No. 4,304,891, issued on Dec. 8, 1981, which is incorporated by reference herein. The homopolymer preferably has a melt flow in the range of about 1 to about 20 and xylene solubles in the range of about 2 to about 6.

The ethylene/alpha-olefin copolymer is the result of the copolymerization of ethylene and an alpha-olefin comonomer having 3 to 8 carbon atoms. It can be prepared by the processes described in European Patent Applications No. 0, 120 501 and 0 120 503, both published on Oct. 3, 1984 and incoporated by reference herein. The density of the copolymer is in the range of about 0.87 to about 0.90 gram per cubic entimeter. The portion of the copolymer attributed to the alpha-olefin comonomer is in the range of up to about 40 mole percent based on the total number of moles in the copolymer and is preferably in the range of about 7 to about 30 mole percent. The balance of the copolymer is based on ethylene. The preferred comonomers are propylene, 1-butene, 1-hexene, and 1-octene. The portion of the copolymer based on comonomer is in the range of about 15 to about 60 percent by weight based on the weight of the copolymer, and is preferably in the range of about 20 to about 45 percent by weight. These ethylene/alpha-olefin copolymers are considered to be soft polymers because they are semi-crystalline. The crystallinity is in the range of about 20 to about 35 percent by weight. The copolymer has a melt index in the range of about 0.1 to about 10 grams per 10 minutes and preferably in the range of about 0.3 to about 1.0 gram per 10 minutes. Melt index is determined by ASTM D-1238, Condition E. It is measured at 190° C. The isotactic polyproplylene and the ethylene/alpha-olefin copolymers are, of course, not reactive with one another.

Subject composition can be prepared either by physical blending or in situ incorporation of the copolymer in a polypropylene matrix. The proportion of ethylene/alpha-olefin copolymer can be in the range of about 20 percent by weight to about 50 percent by weight based on the weight of the isotactic polypropylene.

A typical blending technique is described as follows: isotactic polypropylene is mixed (dry) with the ethylene/propylene copolymer and the dry mixture is extruded at about 200° C. and pelleted. Conventional stabilizers for the isotactic polypropylene and the ethylene/propylene copolymers are used.

A typical in-situ method is carried out in the following manner: isotactic polypropylene homopolymer is prepared in one reactor and is transferred to another reactor (or reactors) where the ethylene/propylene copolymer is produced in the presence of the polypropylene homopolymer. The in-situ mixture is taken out of the reactor(s), stabilized, and extruded at about 200° C. and pelleted.

Various conventional additives can be added in conventional amounts to subject compositions such as antioxidants, ultraviolet absorbers, antistatic agents, pigments, dyes, fillers including carbon black, slip agents, fire retardants, stabilizers and smoke inhibitors.

The invention is illustrated by the following examples:

EXAMPLES 1 to 6

A polypropylene homopolyer having a melt flow of 4.0 and xylene solubles of 3.5 is blended with an ethylene/propylene copolymer or an ethylene/-butene copolymer wherein the portion of the copolymer based on comonomer, propylene or 1-butene, is present in amounts of 25 and 15 percent by weight, respectively, based on the weight of the copolymer. The copolymer is present in the blend in an amount of 15 to 50 percent by weight based on the weight of the polypropylene. The blend is extruded and pelletized with the following stabilizers: 0.125 weight percent calcium stearate and 0.125 weight percent antioxdiant. The pellets are injection molded into 125 mil specimens for evaluation.

The Table sets forth the variables, i.e., the weight percent of the copolymer based on the weight of the polypropylene; the density of the copolymer in gram per cubic centimeter; and the crystallinity in percent by weight, and the results.

The tests used to obtain the results are as follows:

1. The Gardner Impact (−30° C.) test is carried out according to ASTM D-3029. This test involves dropping a weight from a defined height onto an injection molded disk, 125 mil thick, which has been preconditioned at −30° C. The results are given in inch-pounds (inch-lbs).

2. The 1% SFM (Secant Flexural Modulus) test is carried out according to ASTM D-790. The results are given in pounds per square inch (psi).

3. The blushing (10 lbs) test is carried out as follows: An injection molded disk is used. The apparatus is the same as for the Gardner Impact test except that the falling weight (a steel bar) is 10 pounds. The steel bar is dropped on the disk. The disk is then aged at room temperature for 24 hours. Stress-whitening or blushing appears on the disk in the form a circle. The extent of stresswhitening is defined by the diameter of the circle measured in fractions of an inch (in).

4. Crystallinity is measured by Differential Scanning Colorimeter (DSC) using a Dupont 990 analyzer with a pressure DSC cell.

TABLE

| Examples | Comonomer | % Co-Polymer | Density (g/cc) | Crystallinity (% by wt.) | Gardner Impact (inch-lbs) | 1% SFM (psi) | Blushing (10 lb)(in) |
|---|---|---|---|---|---|---|---|
| 1 | propylene | 30 | 0.86 | <2 | >320 | 110,000 | 0.63 |
| 2 | propylene | 15 | 0.87 | 20 | 20 | 160,000 | 0.5 |
| 3 | 1-butene | 30 | 0.87 | 20 | >300 | 125,000 | 0.4 |
| 4 | 1-butene | 50 | 0.87 | 20 | >320 | 86,000 | 0.0 |
| 5 | 1-butene | 30 | 0.90 | 35 | 175 | 120,000 | 0.26 |
| 6 | 1-butene | 30 | 0.92 | 45 | 20 | 130,000 | <0.1 |
| 7. | 1-butene | 30 | 0.96 | 89 | <10 | 186,000 | 0.0 |

Melt flow is determined in accordance with ASTM-1638.

Xylene solubles are defined as the fraction that stays in solution after the polypropylene sample is dissolved in hot xylene and the solution is allowed to cool to 23° C.

I claim:

1. A molded product exhibiting a blush of less than about 0.4 inch per 10 pounds and a Gardner Impact of at least about 175 inch-pounds comprising:
   (i) isotactic polypropylene; and
   (ii) a copolymer of ethylene and 1-butene, said copolymer (a) having a density of about 0.87 to about 0.90 gram per cubic centimeter and a crystallinity in the range of about 20 to about 35 percent by weight based on the weight of the copolymer and (b) being present in the composition in the range of about 20 to about 50 percent by weight based on the weight of the polypropylene.

2. The molded product defined in claim 1 wherein the portion of the copolymer based on 1-butene is present in the range of about 15 to about 60 percent by weight based on the weight of the copolymer.

3. The molded product defined in claim 2 wherein the portion of the copolymer based on 1-butene is present in the range of about 20 to about 45 percent by weight based on the weight of the copolymer.

* * * * *